US008319146B2

(12) United States Patent
Bunker et al.

(10) Patent No.: US 8,319,146 B2
(45) Date of Patent: Nov. 27, 2012

(54) METHOD AND APPARATUS FOR LASER CUTTING A TRENCH

(75) Inventors: Ronald Scott Bunker, Niskayuna, NY (US); Wenwu Zhang, Schenectady, NY (US); Wilbur Douglas Scheidt, Cincinnati, OH (US); Magdi Naim Azer, Niskayuna, NY (US); Marshall Gordon Jones, Scotia, NY (US); Ching-Pang Lee, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 637 days.

(21) Appl. No.: 12/435,547

(22) Filed: May 5, 2009

(65) Prior Publication Data

US 2010/0282721 A1 Nov. 11, 2010

(51) Int. Cl.
*B23K 26/38* (2006.01)
(52) U.S. Cl. .............................. 219/121.68; 219/121.69
(58) Field of Classification Search ............. 219/121.61, 219/121.62, 121.83, 121.69, 121.68; 416/97 R
See application file for complete search history.

(56) References Cited

U.S. PATENT DOCUMENTS

| | | | | |
|---|---|---|---|---|
| 5,419,971 A | * | 5/1995 | Skelly et al. .................. 428/161 |
| 5,453,594 A | * | 9/1995 | Konecny ................... 219/121.61 |
| 5,520,679 A | * | 5/1996 | Lin .................................... 606/5 |
| 5,747,769 A | * | 5/1998 | Rockstroh et al. ........ 219/121.69 |
| 6,172,331 B1 | * | 1/2001 | Chen .......................... 219/121.71 |
| 6,234,755 B1 | * | 5/2001 | Bunker et al. .............. 416/97 R |
| 6,267,902 B1 | | 7/2001 | Cartier et al. |
| 6,346,687 B1 | * | 2/2002 | Kinoshita et al. ......... 219/121.62 |
| 6,380,512 B1 | * | 4/2002 | Emer ......................... 219/121.71 |
| 6,580,054 B1 | * | 6/2003 | Liu et al. ................... 219/121.68 |
| 6,951,120 B2 | * | 10/2005 | McCaughan et al. .... 219/121.68 |
| 2002/0141869 A1 | * | 10/2002 | Lee et al. ..................... 416/97 R |
| 2002/0149136 A1 | * | 10/2002 | Baird et al. ................... 264/400 |
| 2005/0224474 A1 | | 10/2005 | Kilburn |
| 2005/0235493 A1 | | 10/2005 | Philip et al. |
| 2007/0045574 A1 | * | 3/2007 | Bruland ................... 250/559.13 |
| 2007/0095800 A1 | * | 5/2007 | Chen .......................... 219/121.6 |
| 2007/0241084 A1 | * | 10/2007 | Hoebel et al. ............ 219/121.83 |
| 2008/0020548 A1 | * | 1/2008 | Morikazu et al. ............. 438/463 |
| 2009/0017260 A1 | * | 1/2009 | Kulkarni et al. .............. 428/161 |

FOREIGN PATENT DOCUMENTS

JP 2004-114094 A * 4/2004
(Continued)

OTHER PUBLICATIONS

Machine translation of Japan Patent document No. 2004-114,094, Apr. 2012.*

(Continued)

*Primary Examiner* — Geoffrey S Evans
(74) *Attorney, Agent, or Firm* — Penny A. Colarke

(57) ABSTRACT

A system for producing at least one trench to improve film cooling in a sample is provided. The system includes at least one laser source outputting at least one pulsed laser beam. The pulsed laser beam includes a pulse duration including a range less than about 50 μs, an energy per pulse having a range less than about 0.1 Joule, and a repetition rate with a range greater than about 1000 Hz. The system also includes a control subsystem coupled to the laser source, the control subsystem configured to synchronize a position of the sample with the pulse duration and energy level in order to selectively remove at least one of a thermal barrier coating, a bondcoat and a substrate metal in the sample to form the at least one trench.

11 Claims, 4 Drawing Sheets

FOREIGN PATENT DOCUMENTS

| | | | |
|---|---|---|---|
| JP | 2006-123004 A | * | 5/2006 |
| WO | WO-2008/064863 A1 | * | 6/2008 |

OTHER PUBLICATIONS

Machine translation of Japan Patent document No. 2006-123,004, Apr. 2012.*

Thierry Poirier—Ricardo Castell, Joaquin Lira-Olivares; "Deposition of zirconium monoxide glomeruli by laser ablation"; Mat Res Innovat (1998) 2:97-102.

S. Costil, H. Liao, A. Gammoudi, and C. Coddet; "Influence of Surface Laser Cleaning Combined with Substrate Preheating on the Splat Morphology"; Journal of Thermal Spray Technology; vol. 14(1) Mar. 2005:31-38.

* cited by examiner

METHOD AND APPARATUS FOR LASER CUTTING A TRENCH

BACKGROUND

The invention relates generally to film cooling at high temperatures, and more specifically, to formation of trenches to improve film cooling.

A variety of components in aircraft engines and stationary power systems are operated in extremely hot environments. These components are exposed to hot gases having temperatures up to about 3800 degrees Fahrenheit, for aircraft applications, and up to about 2700 degrees Fahrenheit for stationary power generation applications. To cool the components exposed to the hot gases, these "hot gas path" components typically have both internal convection and external film cooling. For example, a number of cooling holes may extend from a relatively cool surface of the component to a "hot" surface of the component. Film cooling is of a higher benefit since it decreases incident heat flux from hot gases to surfaces of components.

The coolant typically is compressed air bled off a compressor, which is then bypassed around the engine's combustion zone and fed through the cooling holes to the hot surface. The coolant forms a protective "film" between the hot component surface and the hot gas flow, thereby helping protect the component from heating. Furthermore, protective coatings such as for example, thermal barrier coatings (TBCs) may be employed on the hot surface to increase operating temperature of the components. Film cooling is highest when the coolant flow hugs the hot surface. Hence, different surface geometries and shapes such as, but not limited to, trenches and craters, are formed in order to enable a longer duration of contact between the coolant flow and the hot surface and/or cooler effective gas temperature layer on the surface.

Laser drilling and electro-discharge machining (EDM) are commonly used techniques for forming film cooling holes. Film holes are currently drilled prior to or after the coatings are applied. Furthermore, various masking methods are generally employed to form the different surface geometries and shapes to improve film cooling effectiveness. However, the masking methods are not precise enough in terms of forming the geometries of predetermined dimensions and also result in deposition of the coatings like TBCs, into undesirable locations within the film holes.

Conventional lasers for cooling hole drilling use lasers with high pulse energy, around millisecond pulse duration, relatively low repetition rate (<1000 Hz), and the wavelength is typically 1064 nm or 10640 nm. Such laser processing results in a high drilling speed due to large pulse energy and high average power. However, it also results in a large heat affected zone, undesirable degree of delamination, and over drilling. On the other hand, shorter pulsed (<200 nanosecond) lasers are good for shallow structures (such as <500 micron features), but due to their low average power (<20 W) and low pulse energy (<1 mJ), and due to the specialty of film cooling holes (>2 mm in thickness, special applications in aviation etc.), these lasers have not been well developed into film cooling hole applications. Accordingly, existing laser systems mentioned above need further development to be both feasible and cost effective for desired applications.

Accordingly, there is a need for an improved laser technique to address one or more aforementioned issues.

BRIEF DESCRIPTION

In accordance with an embodiment of the invention, a system for producing at least one trench to improve film cooling in a sample is provided. The system includes at least one laser source outputting at least one pulsed laser beam. The pulsed laser beam includes a pulse duration including a range less than about 50 µs, an energy per pulse having a range less than about 0.1 Joule, and a repetition rate with a range greater than about 1000 Hz. The system also includes a control subsystem coupled to the laser source, the control subsystem configured to synchronize the position of the sample with the pulse duration and energy level in order to selectively remove at least one of a thermal barrier coating, a bondcoat and a substrate metal in the sample to form the at least one trench.

In accordance with another embodiment of the invention, a method for producing at least one trench to improve film cooling in a sample is provided. The method includes applying at least one laser beam to the sample, wherein the laser beam including a pulse duration including a range less than about 50 µs, an energy per pulse having a range less than about 0.1 Joule, and a repetition rate with a range greater than about 1000 Hz. The method also includes selectively removing at least one of a TBC, a bondcoat and a substrate metal in the sample via synchronization of a position of the sample with the pulse duration to form the at least one trench.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a system and method for producing one or more surface geometries and shapes to improve film cooling in a sample. The system and method disclose an improved laser machining technique via employing a pulsed laser with a shorter pulse duration, lower pulse energy, suitable wavelength, and higher cycle time. As used herein, the term 'pulse duration' refers to duration of each energy pulse output from the laser, and 'cycle time' refers to repetition rate or frequency of the pulses output from the laser. An exemplary application of the lasers, as discussed in detail below, is in film cooling holes formed on a substrate such as, but not limited to, an airfoil in a turbine engine. It should be noted that the technique may be employed in various other applications such as, but not limited to, film cooling of combustor components, turbine endwalls and platforms, turbine shrouds, repaired components and also the selective removal of one or more external surface coatings on such components for purposes other than film cooling . . . .

The substrate can be any material, which is exposed to high temperatures and requires cooling. Examples include ceramics or metal-based materials. "Metal-based" refers to substrates which are primarily formed of a single metal or metal alloys, but which may also include some non-metallic components, e.g., ceramics, intermetallic phases, intermediate phases, or ceramic matrix composites. Non-limiting examples of metals related to this invention are steel, aluminum refractory metals such titanium; and superalloys, such as those based on nickel or cobalt.

Figure 1:
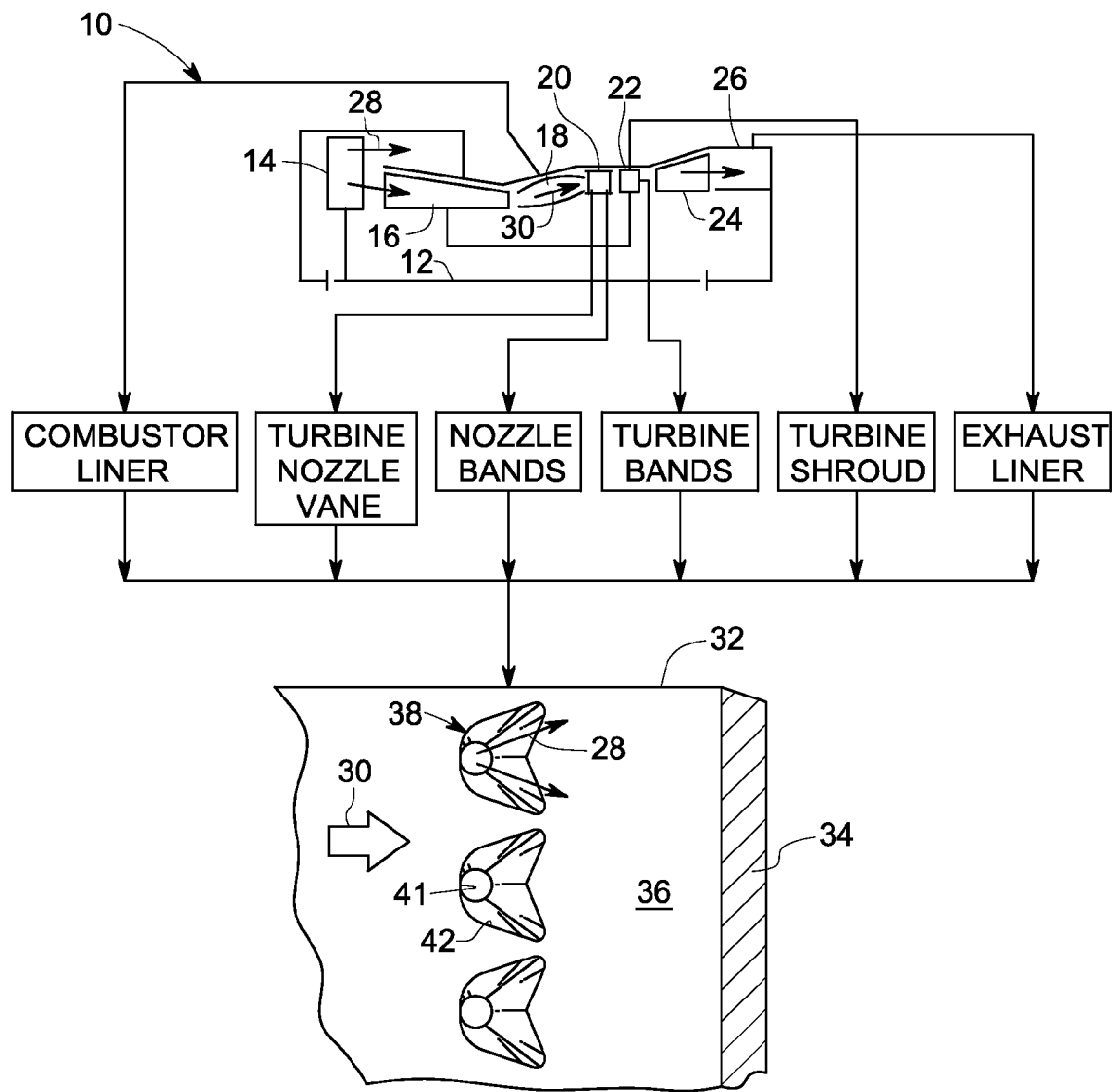
FIG. 1 is a schematic representation of an exemplary gas turbine engine having various components each including a heated wall cooled by a row of chevron film cooling holes in accordance with an embodiment of the invention.

FIG. 1 is a gas turbine engine 10 that is axisymmetrical about a longitudinal or axial centerline axis 12. The engine includes in serial flow communication a fan 14, multistage axial compressor 16, and an annular combustor 18 followed in turn by a high pressure turbine (HPT) and a low pressure turbine (LPT). The HPT includes a turbine nozzle 20 having a row of hollow stator vanes supported in inner and outer nozzle bands. A first stage turbine 22 follows the first stage turbine nozzle and includes a row of hollow rotor blades extending radially outwardly from a supporting rotor disk and surrounded by an annular turbine shroud.

A low pressure turbine (LPT) 24 follows the high pressure turbine and includes additional nozzles and rotor blades which may or may not include internal cooling circuits depending upon the engine design. An exhaust liner 26 follows the low pressure turbine. During operation, ambient air 28 is pressurized by the fan 14, and lower portion of which enters the compressor 16 for additional pressurization, while the outer portion is discharged from a fan outlet for providing propulsion thrust in a turbofan engine application. The air pressurized in the compressor is mixed with fuel in the combustor for generating hot combustion gases 30. The combustion gases flow through the various turbine blade stages which extract energy therefrom for powering the compressor and fan during operation. The exemplary turbofan engine 10 illustrated in FIG. 1 may have any conventional configuration and operation, but is modified as a herein described for introducing improved film cooling. Any one or more of the various engine components disclosed above which are subject to heating from the hot combustion gases 30 may be suitably cooled by bleeding a portion of the pressurized air from the compressor 16 during operation. In this regard, any one of those heated components that require cooling will include a thin metal wall 32, a portion of which is illustrated in FIG. 1 as representative of the various components of the engine in which film cooling may be utilized.

The thin wall 32 is typically formed of a conventional superalloy metal, such as a cobalt-based material, having high strength at the elevated temperatures experienced in operation of the gas turbine engine due to heating from the hot combustion gases 30. The flowpath component or wall 32 is illustrated in part in plan view in FIG. 1, includes opposite inner and outer wall surfaces 34,36. The inner or inboard surface of the wall forms the outer boundary of a suitable cooling circuit provided in the component, which receives air, bled from the compressor in any conventional manner. The outer surface 36 is exposed to the hot combustion gases 30 during operation and requires suitable film cooling protection.

The exemplary component wall 32 illustrated in FIG. 1 may be in the form of the inner or outer combustor liners, the turbine nozzle vanes, the turbine nozzle bands, the turbine rotor blades, the turbine shroud, or the exhaust liner, for typical examples, which utilize various forms of film cooling holes therein. Further details of cooling effectiveness technique may be obtained from U.S. Pat. No. 6,234,755, entitled "METHOD FOR IMPROVING THE COOLING EFFEC-TIVENESS OF A GASEOUS COOLANT STREAM, AND RELATED ARTICLES OF MANUFACTURE", published on May 22, 2001, and assigned to the same assignee as this application, the entirety of which is hereby incorporated by reference herein. Each of the holes 38 includes a preferably cylindrical inlet bore 41 having a substantially constant flow area from its inlet to outlet ends.

The film cooling holes may constitute a variety of shapes. The throat of the hole is usually substantially cylindrical. In the illustrated embodiment, the holes are chevron shaped holes. The holes usually extend from a backside (e.g., internal) surface, also referred to as the "cooler surface" or "cool surface" or the cold sides to a higher-temperature or "hot" surface" or hot sides. In the case of turbine engines, the hot surface is typically exposed to gas temperatures of at least about 1000 degrees Celsius, and more often, at least about 1400 degrees Celsius.

The depth of the cooling hole (i.e., the "length" of a hole when it is situated at an angle with respect to the substrate) is usually in the range of about 20 mils (508 microns) to about 4000 mils (102 mm). Typically, there are about 5 to about 200 holes per square-inch of the outer surface. It should be understood that the present invention is directed to any number of cooling holes. Moreover, while the invention is especially suitable for individual rows of holes, other patterns of holes are also possible. Furthermore, the cooling holes do not have to be film cooling holes, although those types of holes are the type usually found in turbine engine components.

Figure 2:
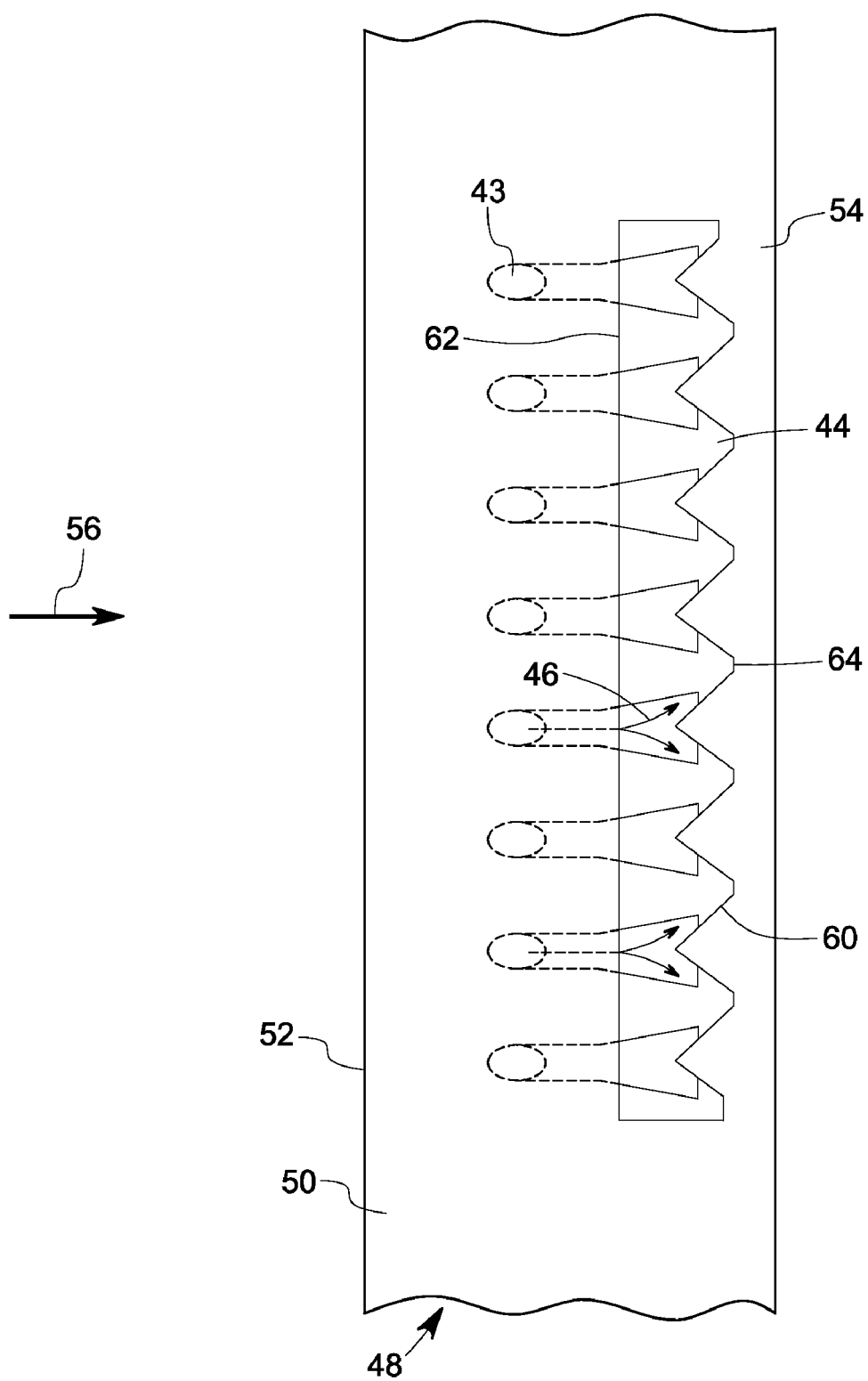
FIG. 2 is a schematic illustration of an exemplary surface geometry formed employing the improved laser technique to accommodate the cooling holes in FIG. 1 to improve cooling effectiveness.

FIG. 2 is a schematic illustration of an exemplary surface geometry formed employing the improved laser technique to accommodate cooling holes 43 to improve cooling effectiveness. The exemplary surface geometry formed herein is a trench 44. Substrate 48 again represents a wall of a sample, e.g., an airfoil, which includes hot surface 50 and a cooler surface 52. The substrate is partially coated with a bond layer (not shown) and an overlying TBC 54, although other types of coatings are possible. TBC's may be applied to the hot side of the airfoil, to further increase its operating temperature capability. As an example, a bond layer can first be applied over the airfoil. The bond layer may be applied by a variety of conventional techniques, such as PVD, CVD, or a thermal spray process. Examples of thermal spray processes are vacuum plasma deposition, high velocity oxy-fuel (HVOF), or air plasma spray (APS). Combinations of thermal spray and CVD techniques may also be employed. A commonly-used bond layer is formed of a material like "MCrAlY", where "M" represents iron, nickel, or cobalt. Another type of bond layer is based on an aluminide or noble metal-aluminide material (e.g., platinum-aluminide). Such a material can be applied by various well-known techniques, such as pack diffusion processes. The TBC is then applied over the bond layer. In the case of turbine airfoils, the TBC is often a zirconia-based material, stabilized with an oxide such as yttria. The TBC is typically applied by a thermal spray technique, or by electron beam physical vapor deposition (EB-PVD).

The trench 44 is formed within the thickness of the coatings and has a predetermined depth D. In a particular embodiment, the depth D of the trench is less than the average throat diameter d of the film cooling holes. The term 'throat diameter' refers to diameter of the hole at a location wherein the coolant exits the hole. In another embodiment, the depth D of the trench is less than about 50% of the average throat diameter d. In yet another embodiment, the depth of the trench is preferably at least twice the hole diameter. Such a deep trench may sometimes result in the need for strengthening of the substrate, e.g., greater wall thicknesses. It should be noted that the trench may also be partially formed in the substrate.

Coolant air 46 flows upwardly from the cooler surface 52 through film cooling holes 42. The film cooling holes, as illustrated herein, happen to be diffusion-shaped, but could be other shapes as well. Combustion gases 56 are conventionally channeled over the substrate.

In the illustrated embodiment of FIG. 2, the coatings have been patterned into "delta" shaped-features 60. The delta features may have a base 62, and individual peaks 64. The dimensions of the delta features may vary significantly, and their orientation within trench 44 can also vary. (Based on the teachings presented herein, those skilled in the art can perform simulated or actual coolant flow tests. These tests would help one to readily determine the effect of varying the shape or orientation of a delta-like feature on coolant flow relative to hot surface 50). In the exemplary embodiment, each peak of a delta feature is directed towards an opposing cooling hole 42. In this manner, the delta feature lies directly in the path of coolant flow exiting the sites. The shapes thereby function as an intended obstruction, disrupting the flow of coolant. This rather sudden disruption of the flow of coolant results in the coolant stream contacting a greater area of the hot surface, while minimizing the tendency to mix with the combustion gases, leading to greater cooling effectiveness.

Figure 3:
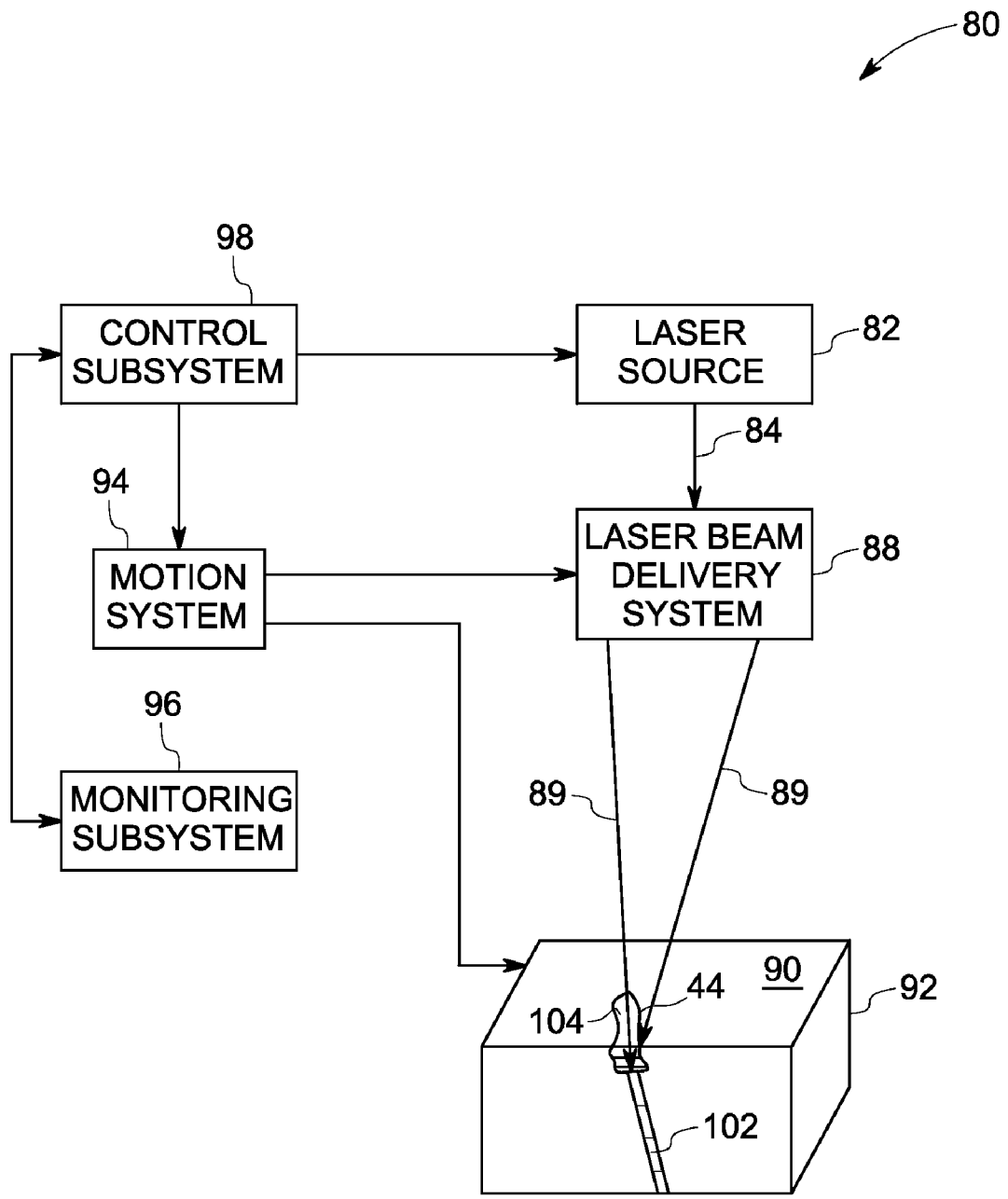
FIG. 3 is a schematic illustration of a system for producing at least one trench to improve film cooling in a sample in accordance with an embodiment of the invention.

Various techniques are available for incorporating delta features or other shapes into trench 44. One such exemplary technique is illustrated in FIG. 3, which is a schematic illustration of a system 80 for producing at least one trench 44 to improve film cooling in a sample. In the exemplary embodiment, the system 80 forms trenches 44, as referenced in FIG. 2. In yet another embodiment, the holes have a diameter in a range between about 0.005 inch to about 0.070 inch and may be egg shaped or conical. In another embodiment, the sample is an airfoil or an endwall in a turbine. The system 80 includes a laser source 82 outputting a pulsed laser beam 84. The laser source 82 has pulse duration less than about 50 μs with energy per pulse less than about 0.1 Joule. The pulses are activated with a repetition rate greater than about 1000 Hz. In one embodiment, the wavelength of the laser beam 84 is in a range between about 200 nm to about 1100 nm. In another embodiment, the average power of the laser beam is larger than 20 W with desirable beam quality to focus down to spot sizes less than about 200 microns. In an exemplary embodiment, the pulse duration is between about 10 μs and about 200 ns. In another embodiment, the pulse duration is between about 50 μs and about 1 femtosecond. With such a laser, a wide range of laser intensity can be achieved, while negative effects of laser machining are mitigated due to lower pulse energy, suitable wavelength and shorter pulse duration, in the mean time, high material removal rate can be reached.

A laser beam delivery system 88 coupled to the laser source 82 transmits one or more beams 89 on a surface 90 of a sample 92. In one embodiment, the laser beam delivery system 88 employs a mirror-lens-machining head based beam delivery. In another embodiment, the laser beam delivery system 88 employs a fiber-machining head based beam delivery. In yet another embodiment, the laser beam delivery system 88 employs an optical galvanometer scanner based beam delivery. A motion system 94 is further coupled to the laser beam delivery system 88 to synchronize relative location between laser beam firing and the sample 92. A monitoring subsystem 96 detects location of laser applying path and progress of the laser machining. The monitoring subsystem 96 also collects the information and communicates back and forth with a control subsystem or a processor 98 that automatically stops the laser machining and moves to a next machining location as and when desired. The control subsystem 98 is in communication with the laser source 82, the laser beam delivery system 88, monitoring subsystem 96, and the motion system 94.

The laser pulse energy being less than about 0.1 J, enables machining out desired features layer by layer, referenced by numeral 102. The laser beam 89 is overlapped to machine out 3D geometries of film cooling holes 104. The direction of the laser beam 89 relative to the sample 92 may be adjusted to achieve desirable laser machining quality. In a particular embodiment, a single laser, such as a high power nanosecond laser or micro-second laser, carries out both of a top 3D geometry and lower metering holes. In another embodiment, to improve total cycle time, a top 3D feature is created by a short pulsed laser, such as a ns/ps/fs laser, while a lower metering hole is drilled with a high power ms or μs laser. The 3D geometry is created primarily on an ablation process, while a lower metering hole is created by mixed effects of both direct ablation and melting expel.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 4:
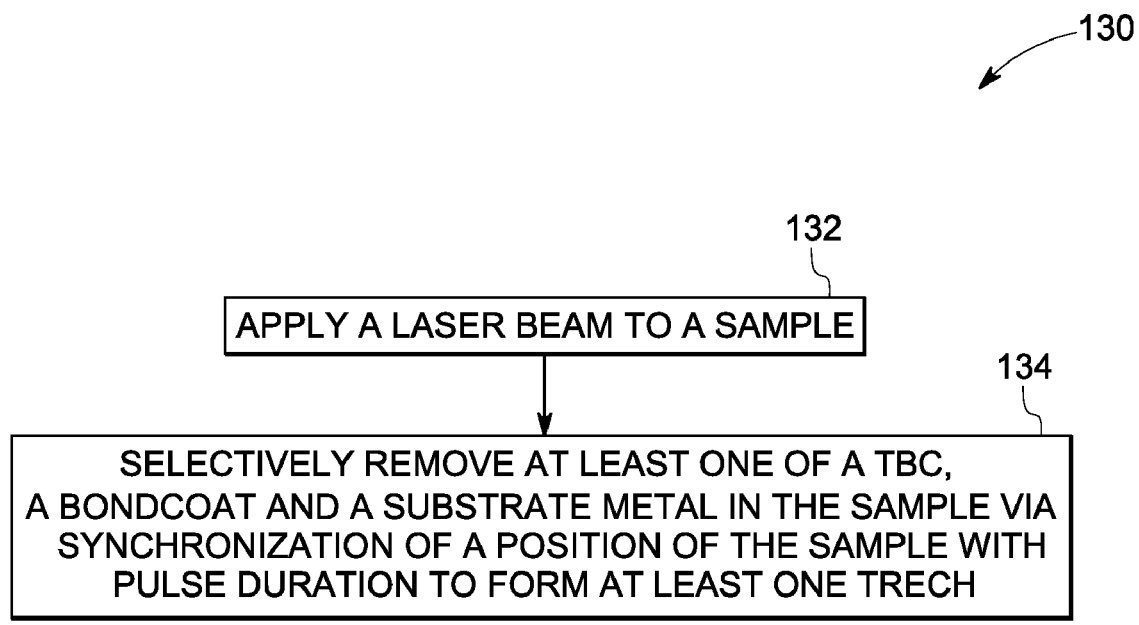
FIG. 4 is a flow chart representing steps in a method for producing at least one trench to improve film cooling in a sample in accordance with an embodiment of the invention.

FIG. 4 is a flow chart representing steps in a method 130 for producing at least one trench to improve film cooling in a sample. The method 130 includes applying a laser beam to the sample in step 132. The laser beam has pulse duration less than about 50 μs with energy per pulse less than about 0.1 Joule. The pulses are activated with a repetition rate greater than about 1000 Hz. In a particular embodiment, the laser beam is aligned on the sample via a control subsystem. At lease one of TBC, a bondcoat and a substrate metal in the sample is selectively removed in step 134 via synchronization of a position of the sample with the pulse duration to form the at least one trench. In one embodiment, a relative location between firing of the laser beam and the sample is synchronized. In another embodiment, a location of the laser beam and progress of laser machining is monitored via a monitoring subsystem.

The various embodiments of a system and method for improved film cooling described above thus enable efficient formation of at least one trench for modifying coolant flow from cooling holes. These techniques and systems also allow for improved repair techniques for film cooled parts such as, but not limited to, turbine engines. Furthermore, the technique provides a cost effective means of formation of the surface geometries.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus configured to produce at least one trench to improve film cooling in a sample comprising one or more film cooling holes having a diameter in a range between about 0.005 inch to about 0.070 inch, comprising:
   at least one laser source outputting at least one pulsed laser beam comprising:
      a pulse duration between about 0.5 µs to about 50 µs;
      an energy per pulse between about 2 milli-Joule to about 100 milli-Joule; and
      a repetition rate greater than about 1000 Hz; and
   a control subsystem coupled to the laser source, the control subsystem configured to synchronize a position of the sample with the pulse duration and energy level of the at least one laser source in order to selectively remove at least one of a thermal barrier coating, a bondcoat and a substrate metal in the sample to form the at least one trench to a depth of substantially the same as an average diameter of each of the one or more film cooling holes.

2. The apparatus of claim 1, comprising a laser beam delivery system and a motion system coupled to the laser source and the control subsystem, the motion system configured to synchronize a relative location between firing of the laser beam and the sample.

3. The apparatus of claim 1, comprising a monitoring subsystem coupled to the control subsystem, the monitoring subsystem configured to detect location of the laser beam and monitor progress of the laser machining.

4. The apparatus of claim 1, wherein the wavelength of the laser beam comprises a range between about 200 nm to about 1100 nm.

5. The apparatus of claim 1, wherein the apparatus is further configured to selectively remove a thermal barrier coating comprising a zirconia based material.

6. The apparatus of claim 1, wherein the apparatus is further configured to produce at least one trench to improve film cooling in a sample comprising an airfoil or an endwall in a turbine.

7. The apparatus of claim 1, wherein the pulse duration comprises a range between about 0.5 µs and about 10 µs.

8. A method for producing at least one trench to improve film cooling in a sample comprising one or more film cooling holes having a diameter in a range between about 0.005 inch to about 0.070 inch, comprising:
   applying at least one laser beam to the sample, the laser beam comprising:
      a pulse duration between about 0.5 µs to about 50 µs;
      an energy per pulse between about 2 milli-Joule to about 100 milli-Joule; and
      a repetition rate greater than about 1000 Hz; and
   selectively removing at least one of a thermal barrier coating, a bondcoat and a substrate metal in the sample via synchronization of a position of the sample with the pulse duration to form the at least one trench to a depth of substantially the same as an average diameter of each of the one or more film cooling holes.

9. The method of claim 8, wherein said applying comprises aligning the laser beam on the sample via a control subsystem.

10. The method of claim 8, wherein said selectively removing comprises synchronizing a relative location between firing of the laser beam and the sample.

11. The method of claim 8, wherein said selectively removing comprises detecting location of the laser beam and monitoring progress of laser machining via a monitoring subsystem.

* * * * *